United States Patent [19]

Raub et al.

[11] Patent Number: 5,406,795
[45] Date of Patent: Apr. 18, 1995

[54] EXHAUST MANIFOLD TO TURBINE CASING FLANGES

[75] Inventors: Jonathan H. Raub; Glenn L. Baker, both of Columbus, Ind.

[73] Assignee: Cummins Engine Company, Inc., Columbus, Ind.

[21] Appl. No.: 183,842

[22] Filed: Jan. 21, 1994

[51] Int. Cl.⁶ .............................................. F02B 33/44
[52] U.S. Cl. ................................ 60/605.1; 415/213.1
[58] Field of Search ..................... 60/605.1; 415/213.1

[56] References Cited

U.S. PATENT DOCUMENTS

| | | |
|---|---|---|
| 1,517,234 | 11/1924 | Junggren . |
| 1,796,325 | 3/1931 | Flanders . |
| 1,873,743 | 8/1932 | Doran . |
| 2,764,266 | 9/1956 | Haworth . |
| 3,383,092 | 5/1968 | Cazier ............... 60/605.1 |
| 4,351,154 | 9/1982 | Richter ............... 60/605.1 |
| 4,492,078 | 1/1985 | Williamson . |

FOREIGN PATENT DOCUMENTS

| | | |
|---|---|---|
| 0086514 | 5/1985 | Japan .................... 60/605.1 |
| 4-241706 | 8/1992 | Japan . |
| 560993 | 9/1977 | U.S.S.R. . |

*Primary Examiner*—Richard A. Bertsch
*Assistant Examiner*—Charles G. Freay
*Attorney, Agent, or Firm*—Woodward, Emhardt, Naughton Moriarty & McNeil

[57] ABSTRACT

An internal combustion engine has a turbocharger inlet flange mounted to the outlet flange of the exhaust manifold of the engine. The exhaust gas flow out of the manifold is through two ports having a centrally located guide wall directing flow from the manifold out the flange into the turbocharger inlet. The two ports are trapezoidal in shape with a short common dividing wall which, for each port, blends at a short radius into two diverging straight walls, one at each end of the common wall, and which blend from their ends into the outer wall of the port, resulting in trapezoidal port shape. The inlet flange of the turbocharger casing has ports matching and in registry with the two ports of the exhaust manifold flange.

27 Claims, 4 Drawing Sheets

EXHAUST MANIFOLD TO TURBINE CASING FLANGES

BACKGROUND OF THE INVENTION

1. Field of the Invention

This invention relates generally to internal combustion engines, and more particularly to endurance of the flanged connection of the turbocharger to the exhaust manifold.

2. Description of the Prior Art

In many multi-cylinder in-line engines, the exhaust manifold has a flange to which a turbocharger is mounted. The exhaust passageways from the opposite ends of the engine merge toward the flange, but there is a dividing wall in the region of the manifold near the flange, for guiding and improving the exhaust gas flow from the opposite ends into the turbocharger. Similarly, in some turbochargers the exhaust gas inlet flange of the casing has a dividing wall considered desirable for its effect on the direction of the gas flow to the turbine. In such cases, it is desirable that the exhaust manifold flange to which the casing flange is mounted, and the gasket between the turbocharger casing flange and the manifold flange, also have a dividing wall at the mating mounting flanges. With conventional arrangements, cracking at the dividing wall of the flange on the turbocharger casing and at the dividing wall of the manifold flange has occurred after a prolonged period of use. It is believed that this cracking is the result of thermal stresses occurring as an engine warms up or endures changes in power output, either of which changes the exhaust temperature. There has been a need to extend the life of manifold-to-turbocharger flanges.

SUMMARY OF THE INVENTION

Described briefly according to a typical embodiment of the present invention, an internal combustion engine exhaust manifold outlet flange is provided with at least two ports for discharging exhaust gas into a turbocharger inlet. The two ports have a common dividing wall. Each port has two walls diverging from the common wall toward an outer wall in a manner creating a generally trapezoidal port cross sectional configuration at the flange. The length of the common wall at the face of the flange is less than that of any of the other three walls of the trapezoid. At each end of the common wall, there is a small radius blending from the common wall to the adjacent divergent straight wall where thermal stress is distributed along the length of the straight wall, avoiding stress concentration. The turbocharger casing exhaust inlet flange is of the same configuration as the exhaust manifold flange and the two are bolted together with the gas flow ports in registry with each other.

DESCRIPTION OF THE PREFERRED EMBODIMENT

Figure 1:
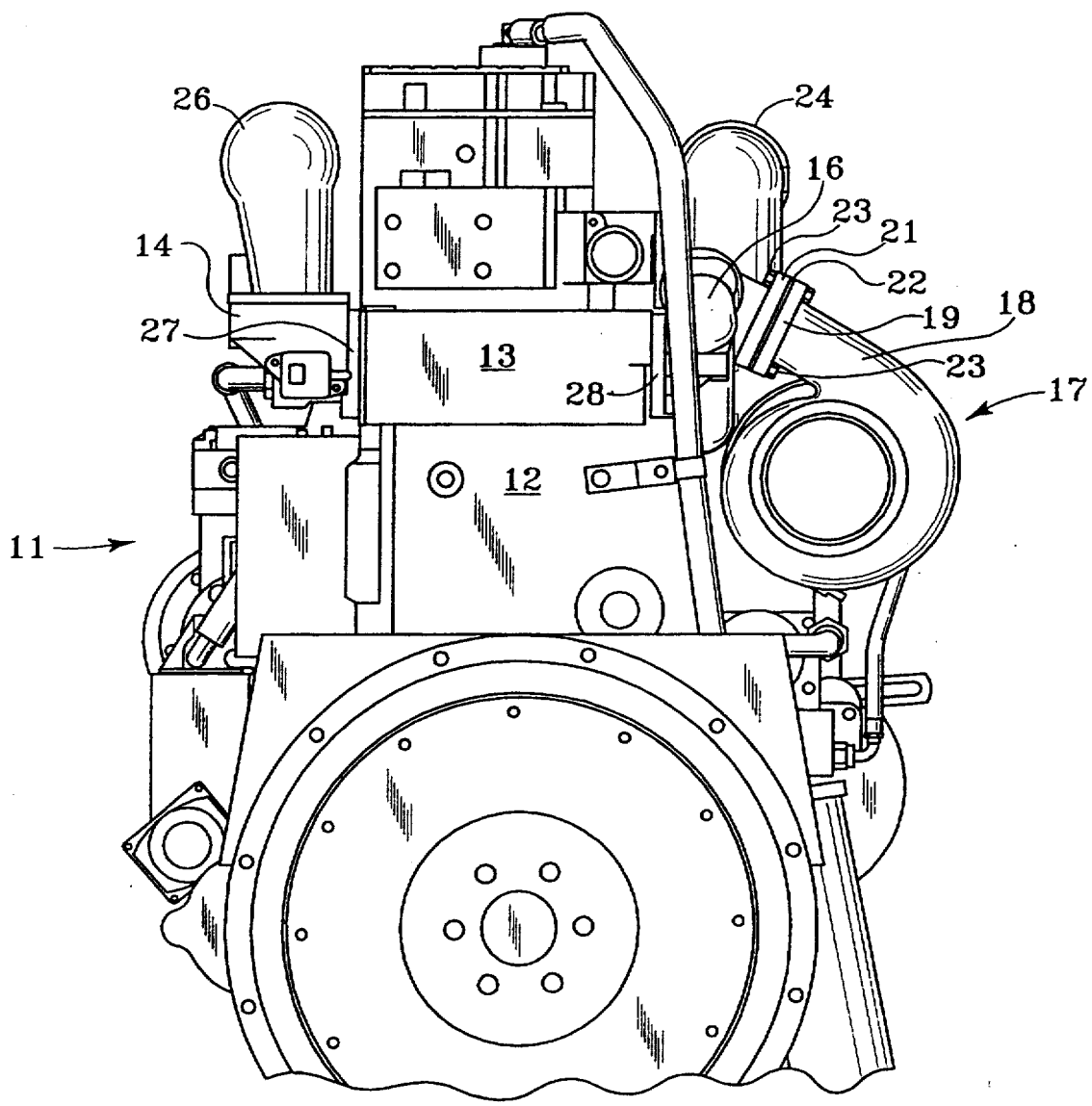
FIG. 1 is a diagrammatic rear end view of a diesel engine including exhaust manifold, turbocharger, and intake manifold.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 illustrates an internal combustion diesel engine 11 having a cylinder block 12, cylinder head 13, intake manifold 14, exhaust manifold 16, and turbocharger 17. The turbocharger casing intake passageway 18 to the turbine therein has a mounting flange 19 mounted on the exhaust manifold flange 21, with a gasket 22 between the flanges. The flanges are held together by bolts 23. The turbocharger outlet 24 is piped through an intercooler (not shown) to the inlet 26 of the intake manifold 14. The other end of the intake manifold is mounted by flange 27 to the cylinder head 13. Similarly, the exhaust manifold 16 is mounted to the opposite side of the cylinder head by flanges 28. The flanges of particular interest for the purposes of the present application are flanges 19 and 21 where the turbocharger is fastened to the exhaust manifold.

Figure 2:
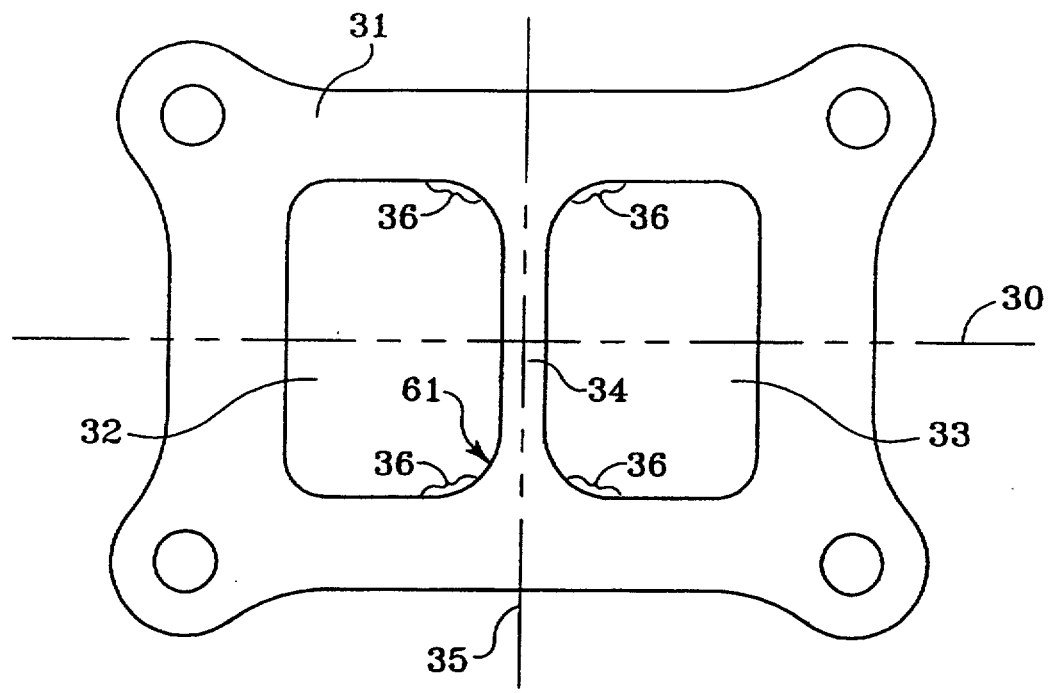
FIG. 2 is a face view showing a prior art turbocharger case mounting flange configuration.

FIG. 2 shows the configuration of a prior art exhaust manifold outlet flange face 31. It has two generally rectangular ports 32 and 33 and a dividing wall 34 considered useful for directing exhaust flow from the exhaust manifold into the turbocharger turbine (not shown). The ports 32 and 33 are identical and separated by the common center dividing wall 34. When flange face 31 is considered with reference to intersecting planes 30 and 35 which are perpendicular to the plane of face 31 and to each other, it is symmetrical about both planes. Port 32 to the left of plane 35 is D-shaped. Port 33 is a mirror image thereof. After a significant period of use in service, cracking has occurred at one or more of the regions 36.

Figure 3:
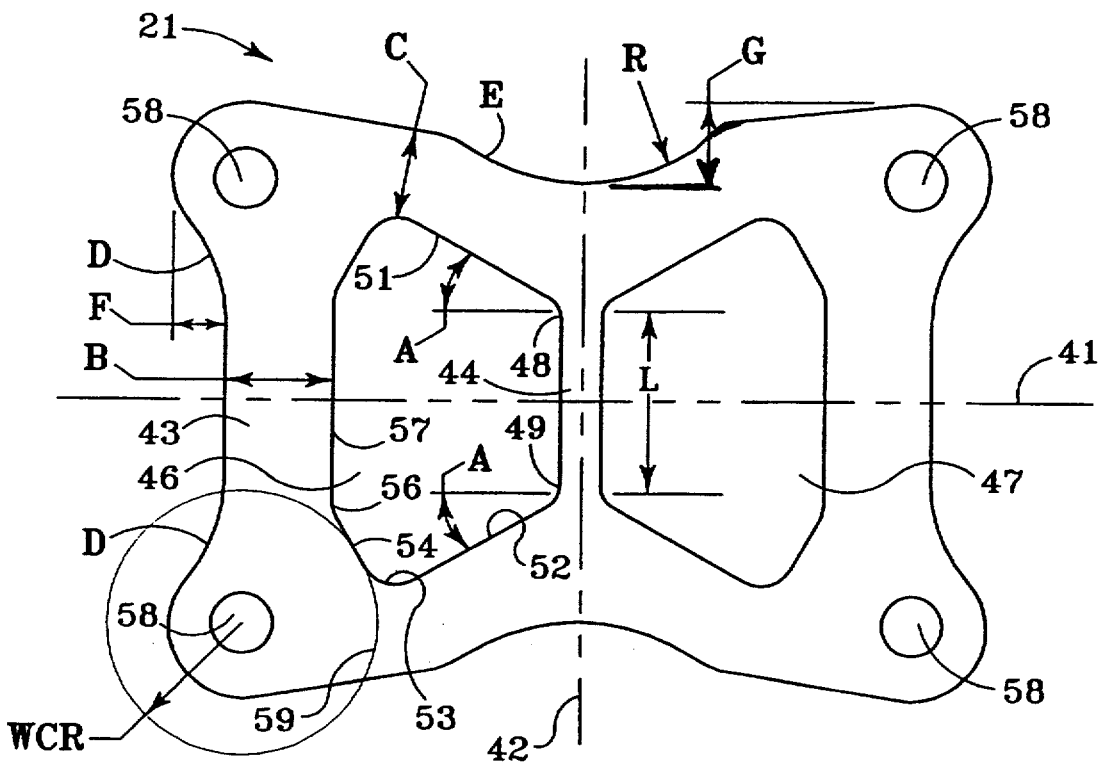
FIG. 3 is a face view of the exhaust manifold outlet flange connection according to the present invention.

Referring now to FIG. 3, the exhaust manifold outlet flange of the present invention is symmetrical with respect to two planes 41 and 42 which are perpendicular to each other and perpendicular to the plane of the face 43 of the flange. Those portions of the flange to the right-side of plane 42 are mirror images of those at the left-side of plane 42. Similarly, the portions above plane 41 are mirror images of those below plane 41. The turbocharger is of the twin entry type having a center guide wall 45 (FIG. 4) extending from the flange 360° around the volute and connected on both sides for a length of about 5 centimeters (cm.) into casing 18. The rear portion of the exhaust manifold for the back three cylinders, and the front portion of the exhaust manifold for the front three cylinders blend into the center dividing wall 44 at flange 21 which is in registry with wall 45 of the turbocharger casing inlet flange 19 and divides the exhaust passage into the flange 21 into two ports 46 and 47 which are mirror images of each other and share the common wall 44. It is important that the area of the ports 46 and 47 be at least equal to the area of the ports 32 and 33 of the flange of the prior art (FIG. 2), if they are to serve the same engine, which is the intent. But the configuration makes a large difference in longevity. In this example, that portion of wall 44 facing the port 46 blends at inner transition regions 48 and 49 of less than 7 mm radius, and/or a length of 8% or less (each) of the port perimeter, into the straight walls 51 and 52 which as they extend outward from the center wall 44, diverge from a plane parallel to plane 41 at a trapezoidal angle A of 30° to 35°. These walls 51 and 52 blend at outer transition regions in a smooth curve such as at 53 for wall 52, into an intermediate straight wall 54 which blends at 56 into a straight wall 57 parallel to wall 44. The configuration of each other quarter section (with respect to planes 41 and 42) of the flange and the port through it is the same as, or a mirror image of the quarter section just described. Thus, each port, whether considered as a quarter section of the face or in its entirety, has a trapezoidal shape.

Since there are the four bolt holes 58 at the four remote corners of the flange, and it is necessary to provide sufficient wrench clearance centered on those bolt holes, and this is a particularly important consideration for smaller engines with smaller manifolds and turbocharger flanges, the intermediate wall 54 is preferably located tangent to a circle 59 centered at the bolt hole 58. The same port wall relationship is established for all four bolt holes.

Due to the configuration of the flange of the present invention, the pair of ports 46 and 47 together with common wall 44 resembles a bow tie. This configuration enables the ports to have the same area as in the prior art flange of FIG. 2 while preserving the relationship of the bolt holes 58 which have the same spacing as in the prior art flange of FIG. 2. In order to reduce thermal inertia and stiffness of surrounding constraining material in the flanges, and thereby improve transient response, provide suitable thermal stress distribution and lower stress, and yet provide adequate port size and gasket sealing width as at locations B and C, for example in FIG. 3, the sides are scalloped as at D, and E. As an example, where the distance between the bolt holes measured in a direction perpendicular to the plane 42 is 127 mm, and the distance between the bolt holes measured in a direction perpendicular to the plane 41 is 85.8 mm, the depth of the scallop side at F is 11.1 mm and at E is R=35 mm to a depth of G=15 mm. As indicated above, there is a gasket between the two flanges. Typically it is stainless steel with a small bead on one face around the pair of ports 46 and 47. The configuration of the gasket and the inlet ports in the turbocharger inlet flange face (FIG. 4) engaging the gasket, is identical to the configuration and ports of the manifold exhaust outlet flange face except that on the gasket there is no dividing wall in the location of flange walls 44 45. The preferred minimum gasket sealing width at B and C in FIG. 3 is 13 mm. The minimum desired wrench clearance radius WCR is 21.8 mm.

Figure 4:
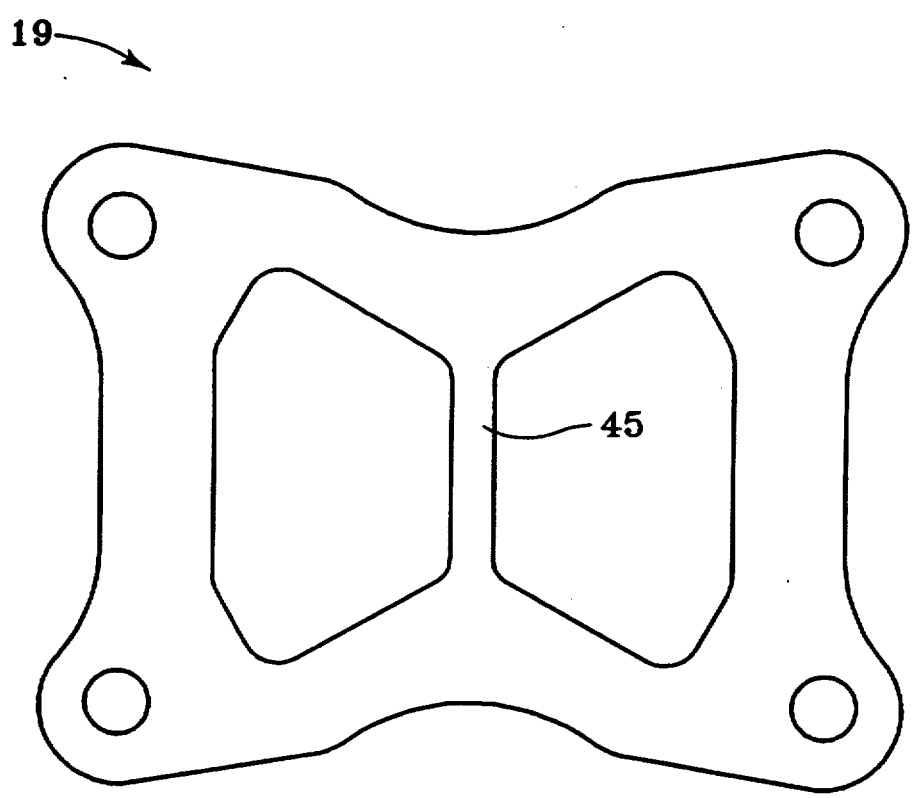
FIG. 4 is a face view of a turbocharger inlet flange according to the present invention.
Figure 5:
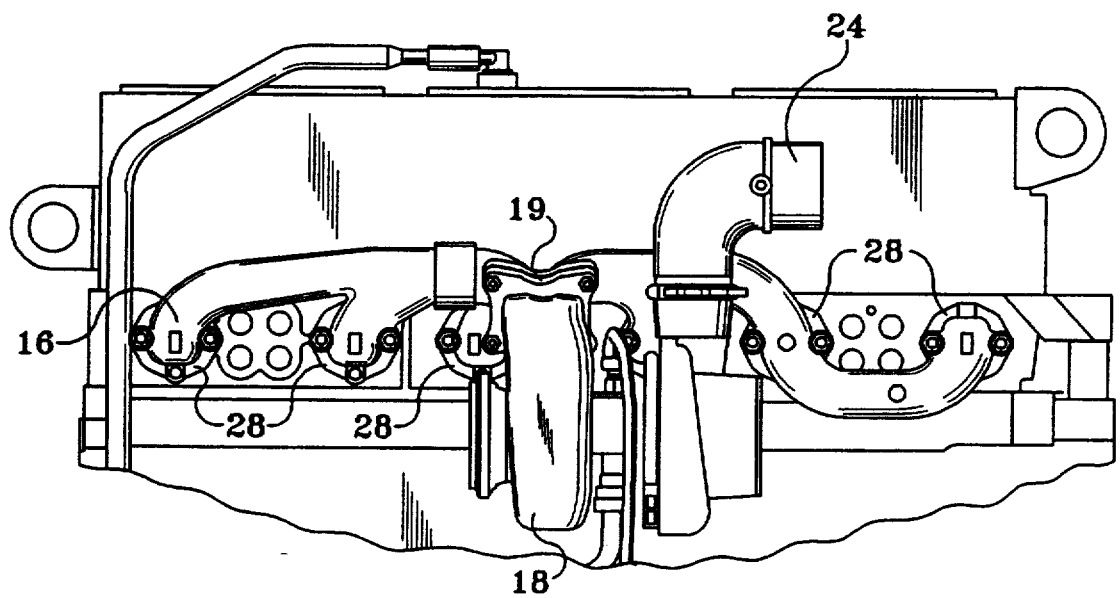
FIG. 5 is a fragmentary side-elevational view of the engine showing the turbocharger secured to the exhaust manifold.
Figure 6:
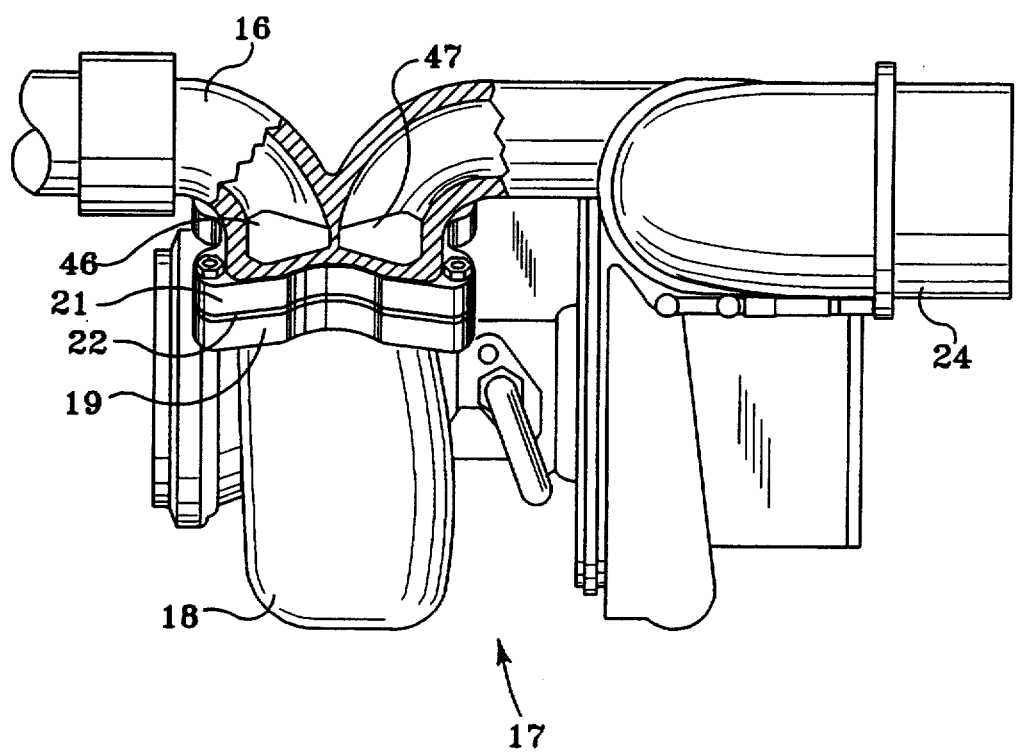
FIG. 6 is a fragmentary top plan view on a larger scale with portions of the exhaust manifold wall broken out to show the outlet passages from the front and rear portions of the exhaust manifold into the turbocharger mounting flange.

By comparison of the illustrations of FIG. 2 and FIG. 3, and although the drawings are not to scale, it should be noted that the length L of the center wall 44 of the flange according to the present invention is much less than that of the center wall 34 of the prior art flange. It is preferable that this length be no greater than 15.5 percent of the total internal perimeter of the port 47 at the flange face 43. It is also desirable that the length of the straight wall 52 at the trapezoidal angle A be at least 22.0 percent of the total internal perimeter of the port 46 and that the length of the curved transition wall 49 be equal to or less than 8% of the total internal perimeter of port 46. It is also desirable that the trapezoidal angle A be at least 30°. FIG. 4 shows the exhaust inlet flange 19 of the turbocharger casing 18. The configuration is identical to that of FIG. 3, and the ports and holes thereof are in registry with those of the exhaust manifold flange of FIG. 3. The faces of the flanges 21 and 19 are flat. The material of both the turbocharger housing flange and manifold flange is ductile iron.

Changing from the D-shaped port of the prior art to the trapezoidal port shape of the present invention minimizes the length of the center dividing wall between the ports, while maximizing port area. Decreasing the size of the center dividing wall blend radius 49 (FIG. 3) from that at 61 (FIG. 2) of the prior art, moves the thermal stress concentration into a lower stress area. The result is that thermal stress is distributed along the long straight side 51, 52 of the trapezoid, resulting in minimal stress concentration. Thus, the present invention:

1. Maintains required port cross sectional area;
2. Maintains wrench clearance for attachment hardware;
3. Minimizes transient thermal stresses of a type which causes cracking;
4. Maintains the current bolt pattern size;
5. Minimizes the cost and complexity of the components; and
6. Maintains sufficient width for the gasket which seals this joint.

It will be recognized that the use of two straight portions such as 54 and 57 with a blend 56 between them in the outer wall two quarters from diverging wall 51 to diverging wall 52 of each port helps optimize port area. A curved wall could be used in these quarters and still provide a generally trapezoidal port with its advantages according to the present invention. In either case, the length L of the common wall is less than half the length of the outer wall between the ends of the diverging walls 51 and 52.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An internal combustion engine exhaust manifold flange, for receiving thereon a turbocharger casing inlet flange, and wherein:

the exhaust manifold flange has four outer corners and two exhaust ports inboard of the corners, the ports having a common dividing wall, each port having two generally straight walls extending outward from the dividing wall toward two of the corners, and each port having an outer wall extending generally parallel to the dividing wall whereby each of the ports has a generally trapezoidal shape.

2. The exhaust manifold flange of claim 1 and further comprising, for each port:
transition walls between the dividing wall and the two outwardly extending walls, and between the outwardly extending walls and the outer wall.

3. The flange of claim 2 wherein:
the length of the dividing wall is less than the length of any other wall of the port except the transition walls.

4. The flange of claim 2 and wherein:
each of the transition walls between the dividing wall and the outwardly extending walls has at least one radius less than 7 mm.

5. The flange of claim 2 and wherein:
each of the transition walls between the dividing wall and time outwardly extending walls has a length not exceeding eight percent of the internal perimeter of the port.

6. The flange of claim 5 and wherein:
each of the transition walls between the outwardly extending walls and the outer wall has a short straight portion and a curved portion at each end of the short straight portion; and
the two ports are mirror images of each other.

7. An exhaust inlet flange in a turbocharger casing and wherein:
the flange has exhaust inlet porks matching the porks of the exhaust manifold flange of claim 1,
the exhaust inlet flange being fastened to the manifold flange, with the inlet ports of the inlet flange in registry with the porks of the exhaust manifold flange.

8. The combination of claim 7 and wherein:
the turbocharger inlet flange has a face which is symmetrical about a first plane which is perpendicular to the face and contains the dividing wall, and the face is symmetrical about a second plane which is perpendicular to the face and to the dividing wall and bisects the dividing wall.

9. An exhaust inlet flange in a turbocharger casing and wherein:
the flange has four outer corners and two exhaust inlet ports inboard of the corners, the ports having a common dividing wall, each port having two generally straight walls extending outward from the dividing wall toward two of the corners, and each pork having an outer wall extending generally parallel to the dividing wall whereby each of the ports has a generally trapezoidal shape.

10. The flange of claim 9 and further comprising, for each port:
transition walls between the dividing wall and the two outwardly extending walls, and between the outwardly extending walls and the outer wall.

11. The flange of claim 10 wherein:
the length of the dividing wall is less than the length of any other wall of the port except transition walls.

12. The flange of claim 10 and wherein:
each of the transition walls between the dividing wall and the outwardly extending walls is curved with at least one radius less than 7 mm.

13. The flange of claim 12 and wherein:
each of the transition walls between the dividing wall and the outwardly extending walls has a length not exceeding eight percent of the internal perimeter of the port.

14. The flange of claim 10 and wherein:
each of the transition walls between the outwardly extending walls and the outer wall has a short straight portion and a short curved portion at each end of the short straight portion; and
the two ports are mirror images of each other.

15. An internal combustion engine exhaust manifold outlet to turbocharger inlet assembly comprising:
an exhaust manifold outlet portion having four outer corners and two exhaust outlet ports inboard of the corners, the ports having a common dividing wall, each port having two generally straight walls extending outward from the dividing wall toward two of the corners, and each port having an outer wall extending generally parallel to the dividing wall whereby each of the ports has a generally trapezoidal shape; and
a turbocharger inlet portion mounted to the exhaust manifold outlet portion and having two exhaust inlet ports in registry with the outlet ports of the exhaust manifold and having a generally trapezoidal shape matching the shape of the exhaust outlet ports.

16. The assembly of claim 15 and wherein:
the length of the dividing wall between each of the two ports of a portion is less than the length of any of the other three walls of the ports.

17. The assembly of claim 15 and wherein:
the exhaust manifold outlet portion is a flange with a bolt hole in each of the four corners;
the turbocharger inlet portion is a flange with a bolt hole in each of the corners; and
bolts received in the bolt holes fasten the flanges together.

18. The assembly of claim 17 and further comprising:
a gasket sandwiched between the flanges and having a port in registry with the ports of the flanges and shaped like the ports of the flanges but without the dividing wall.

19. In a turbocharger casing for mounting to an engine exhaust manifold outlet flange, the improvement comprising:
a turbine intake passageway inlet face having outer corners for receiving fasteners for connection to an engine exhaust manifold flange,
the shape of the face being symmetrical with respect to a first plane perpendicular to the face, and the shape of the face being symmetrical with respect to a second plane perpendicular to the face and to the first plane,
exhaust inlet port means in the face and having two pairs of diverging walls, one pair of walls diverging with reference to the second plane of symmetry toward two of the corners on one side of the first plane of symmetry, and the other pair of walls diverging with respect to the second plane of symmetry toward two of the corners on the opposite side of the first plane of symmetry.

20. The improvement of claim 19 and further comprising:
a center wall in the casing at the face and lying in the first plane of symmetry and dividing the inlet port means into two inlet ports whereby the center wall is common to the two inlet ports,
the first pair of walls extending from one side of the center wall, and
the second pair of walls extending from the other side of the center wall.

21. The improvement of claim 20 and wherein:

each wall of each pair extends from the common wall at an angle of between 120 and 125 degrees.

22. The improvement of claim 21 and wherein: each wall of a pair blends into an end of the common wall in a transition blend whose length is no greater than eight percent of the perimeter of the port.

23. The improvement of claim 22 and wherein: each port has an outer wall extending between the outer ends of the walls of the pair and which is about twice as long as the common wall.

24. The improvement of claim 23 and wherein: the combination of the common wall and the pair of walls and the outer wall of a port provides a generally trapezoidal shape of the port.

25. The improvement of claim 20 and wherein: an outer perimeter wall of the flange is scalloped with a first curve through the first plane above the second plane and a second curve through the first plane below the second plane.

26. The improvement of claim 25 and wherein the curves are centered in the first plane.

27. The improvement of claim 25 and wherein the outer perimeter wall includes straight portions extending from the curves out to the corners, two of the straight portions diverging with reference to the second plane as they extend out from the curves to the corner on one side of the first plane, and two of the straight portions diverging with reference to the second plane as they extend out from the curves to the corners on the opposite side of the first plane.

* * * * *

UNITED STATES PATENT AND TRADEMARK OFFICE
CERTIFICATE OF CORRECTION

PATENT NO. : 5,406,795
DATED : April 18, 1995
INVENTOR(S) : Jonathan H. Raub; Glenn L. Baker It is certified that error appears in the above-indentified patent and that said Letters Patent is hereby corrected as shown below:

Column 5, line 16, change "time" to --the--.

Column 5, line 27, change both occurrences of "porks" to --ports--.

Column 5, line 31, change "porks" to --ports--.

Column 5, line 47, change "pork" to --port--.

Signed and Sealed this

Fourth Day of July, 1995

Attest:

BRUCE LEHMAN

*Attesting Officer*     *Commissioner of Patents and Trademarks*